United States Patent Office 3,557,056
Patented Jan. 19, 1971

---

3,557,056
CURING OF EPOXY RESINS WITH CERTAIN AMINOAMIDES
Dwight E. Peerman, Minneapolis, Minn., assignor to General Mills, Inc., a corporation of Delaware
No Drawing. Continuation-in-part of application Ser. No. 460,460, June 1, 1965. This application Jan. 21, 1969, Ser. No. 792,784
Int. Cl. C08g 30/14
U.S. Cl. 260—47
9 Claims

ABSTRACT OF THE DISCLOSURE

Epoxy resins are cured with compounds of the formulae (I)
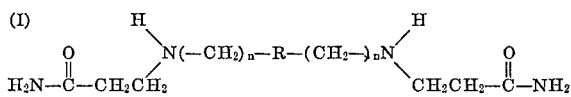

and (II)
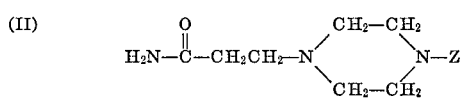

where R is

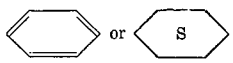

$n$ is 1 to 2, Z is

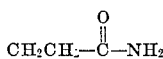

or $(CH_2)_x$—R′, $x$ is 1, 2 or 3, and R′ is

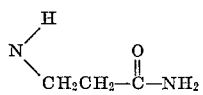

or

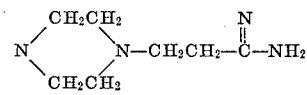

B-stage resins are prepared as well as fully cured products (C-stage).

---

This application is a continuation-in-part of my earlier application Ser. No. 460,460, filed June 1, 1965, and now abandoned.

The present invention relates to novel epoxy resin compositions and to the process of curing epoxy resins with certain aminoamides.

I have discovered that diadducts of acrylamide and certain cyclic polyamines or certain heterocyclic compounds are excellent curing agents for epoxy resins. The rate of reaction with epoxy resins is such that it is possible to combine the diadducts with the epoxy resins, obtain a homogeneous melt, and quench the mixture immediately or after such degree of partial reaction as is desired is accomplished. The resulting quenched mixture or partially reacted combination will then cure to completion rapidly when the temperature is again elevated. From this standpoint, the acrylamide diadducts of the cyclic aliphatic polyamines, such as 1,4-cyclohexyl-bis-methylamine and 1,4-cyclohexyl-bis-ethylamine, or the heterocyclic compounds, such as piperazine or aminoethyl piperazine, are preferred. Their reactivity toward epoxy resins is generally somewhat lower, preparation of mixtures or partially reacted combinations is accomplished with less difficulty, and the resulting mixtures or partially reacted combinations cure relatively rapidly but not so rapidly as to be difficult to handle. Where a particularly rapid curing system is desired, the acrylamide diadducts of the aromatic polyamines may be used, or they may be blended with the acrylamide adducts of cyclic aliphatic polyamines or the heterocyclic compounds to produce intermediate cure rate systems.

By "B-stage" is meant a partially cured intermediate stage in which the two reactants (i.e. the curing agent and epoxy resin) are homogeneously compatible in a stable single phase ready for final curing at elevated temperatures. The curing of the epoxy resin may be considered as proceeding through three stages—A, B and C. The "A-stage" is a simple blend or mixture of the epoxy resin and the curing agent in which essentially no reaction has taken place. With the compounds used as the curing agents in the present invention, such simple blends or mixtures will be stable for extended periods of time at ambient or lower temperatures.

The "B-stage" is the same mixture which has been partially reacted or cured (for example 5 to 90% complete) and is stable for extended periods of time. The "B-stage" resin can be cured at elevated temperatures to yield the finally cured stage, the "C-stage," which is an insoluble and infusible polymer. The partial curing can be effected at various temperatures. At higher temperatures the time of heating becomes short, while at lower temperatures, the heating period is slightly longer and control is easier. In general, it is preferred to prepare the B-stage resins of the present invention at temperatures of 100° to 150° C. which usually requires a time period of 15 minutes to 30 seconds. The "C-stage" resins of the present invention can be prepared at various temperatures, preferably above about 100° C. to 300° C. and higher, from the A-stage mixture or the B-stage resin. Curing time will be shorter for the B-stage resins than for the A-stage mixtures and also depends on the temperatures employed. Thus the time is not critical and cure is normally essentially complete in a few seconds to 30 minutes.

The present invention also provides the advantage that epoxy resins can be cured with the defined curing agents without the liberation of volatile by-products which tend to produce gas bubbles in the curing resin system.

It is, therefore, an object of the instant invention to provide novel curable or hardenable epoxy resin compositions. Another object of the invention is to provide novel partially cured, hardenable epoxy resin compositions. Still another object of the invention is to provide novel infusible, insoluble epoxy resin products. A further object of the invention is to provide novel processes for curing epoxy resins. These and other objects will become apparent from the following detailed description.

The curing agents useful in the present invention have the formulae (I)
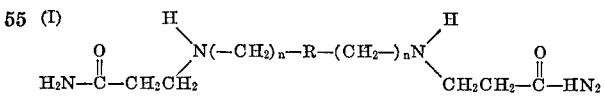

and (II)
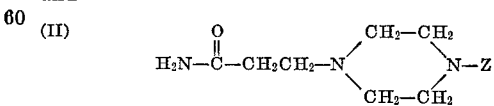

where R is

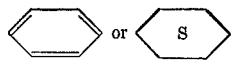

$n$ is 1 or 2, Z is

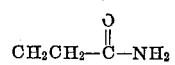

or $(CH_2)_x$—R', x is 1, 2 or 3, and R' is

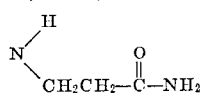

or

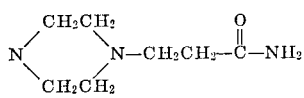

These curing agents are produced by reacting acrylamide with certain cyclic polyamines or certain heterocyclic compounds in a molar ratio of approximately 2:1. The useful cyclic polyamines for preparing the curing agents of Formula I have the structure $$H_2N-(CH_2)_n-R-(CH_2)_n-NH_2$$

where R is

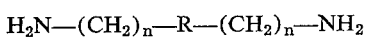

and n is 1 or 2. Representative of such polyamines are 1,4-cyclohexyl-bis-methylamine, 1,4-cyclohexyl-bis-ethylamine, 1,4 - benzene - bis - methylamine, 1,3-benzene-bis-methylamine, and 1,4-benzene-bis-ethylamine. The useful heterocyclic compounds for preparing the curing agents of Formula II have the structure

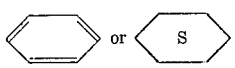

where X is H or $(CH_2)_x$—R'', x is 1, 2 or 3 and R'' is $NH_2$ or

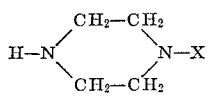

Representative of such heterocyclic compounds are piperazine, aminoethyl piperazine, aminopropyl piperazine, 4-di(bispiperidyl) propane, 4-di(bispiperidyl) methane and the like.

Reaction to produce the defined curing agents may be carried out in any of a variety of ways but preferably the acrylamide is dissolved in a solvent such as methanol and the reaction mixture then heated to reflux temperature. The polyamine or heterocyclic compound is then added slowly and the reaction mixture maintained at reflux temperature until the reaction is complete. Thereafter, the solvent is removed by distillation to yield the final product which, in most instances is either solid or semi-solid.

The present invention is useful for curing epoxy resins in general. The epoxy resins comprise those materials possessing more than one vicinal epoxy group, i.e., more than one

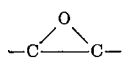

group. These compounds may be saturated or unsaturated, aliphatic, cycloaliphatic, aromatic or heterocyclic, and may be substituted, if desired, with non-interfering substituents such as chlorine, hydroxy groups, ether radicals and the like. The polyepoxides may be monomeric or polymeric. The epoxy group may be terminal or non-terminal.

For clarity, many of the polyepoxides will be referred to hereinafter in terms of their epoxy equivalency. The term "epoxy equivalency" refers to the number of epoxy groups contained in the average molecule of the desired material. The epoxy equivalency is obtained by dividing the average molecular weight of the polyepoxide by the epoxide equivalent weight. The epoxide equivalent weight is determined by heating one gram sample of the polyepoxide with an excess of pyridinium chloride dissolved in pyridine at the boiling point for 20 minutes. The excess pyridinium chloride is then back-tetrated with 0.1 N sodium hydroxide to the phenolphthalein end point. The epoxide value is calculated by considering one HCl as an equivalent of one epoxide. This method is used to obtain all epoxide values reported herein, unless otherwise stated.

If the polyepoxides are single monomeric compounds having all of their epoxide groups intact, their epoxy equivalency will be whole integers, such as 2, 3, 4 and 5. However, in the case of the polymeric-type polyepoxides, many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5 and the like.

The monomeric-type polyepoxide compounds may be exemplified by the following: vinylcyclohexene dioxide, epoxidized soybean oil, butadiene dioxide, 1,4-bis(2,3-epoxypropoxy) benzene, 1,3-bis(2,3-epoxypropoxy) benzene, 4,4'-bis(2,3-epoxyproxy) diphenyl ether, 1,8-bis(2,3-epoxypropoxy) octane, 1,4-bis,2,3-epoxyproxy) cyclohexane, 4,4'-bis(2-hydroxy-3,4-epoxybutoxy) diphenyldimethylmethane, 1,3-bis(4,5-epoxypentoxy) - 5 - chlorobenzene, 1,4-bis(3,4-epoxybutoxy)-2-chlorocyclohexane, diglycidyl ether, 1,3-bis(2-hydroxy-3,4-epoxybutoxy) benzene, 1,4-bis(2-hydroxy-4,5-epoxypentoxy) benzene, 1,2,5,6-di-epoxy-3-hexyne, 1,2,5,6-di-epoxyhexane, and 1,2,3,4-tetra(2-hydroxy-3,4-epoxybutoxy) butane.

Other examples of this type include the glycidyl polyethers of the polyhydric phenols obtained by reacting a polyhydric phenol with a great excess, e.g., 4 to 8 mol excess, of a halogen-containing epoxide in an alkaline medium. Polyhydric phenols that can be used for this purpose include bis-phenols, resorcinol, catechol, hydroquinone, methyl resorcinol, or polynuclear phenols, such as 2,2-bis(4-hydroxyphenyl) butane, 4,4' - dihydroxybenzophenone, bis(4-hydroxyphenyl) ethane, and 1,5-di-hydroxynaphthalene. The halogen-containing epoxides may be further exemplified by 3-chloro-1,2-epoxybutane, 3-bromo-1,3-epoxyhexane, 3-chloro-1,2-epoxyoctane and the like.

Examples of the polymeric-type polyepoxides include the polyepoxypolyhdroxy polyethers obtained by reacting, preferably in an alkaline or an acid medium, a polyhydric alcohol or polyhydric phenol with a polyepoxide, such as the reaction product of glycerol and bis(2,3-epoxypropyl) ether, the reaction product of sorbitol and bis(2,3-epoxy-2-methylpropyl) ether, the reaction product of pentaerythritol and 1,2-epoxy-4,5-epoxypentane, the reaction product of bis-phenol and bis(2,3-epoxy-2-methylpropyl) ether, the reaction product of resorcinol and bis(2,3-epoxypropyl) ether, and the reaction product of catechol and bis(2,3-epoxypropyl) ether.

A further group of the polymeric polyepoxides comprises the hydroxy-substituted polyepoxide polyethers obtained by reacting, preferably in an alkaline medium, a slight excess, e.g., 0.5 to 3 mol excess, of a halogen-containing epoxide as described above, with any of the aforedescribed polyhydric phenols, such as resorcinol, catechol, bis-phenol, bis(2,2' - dihydroxy-dinaphthyl) methane and the like.

Also included within this group are the polyepoxy polyethers obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethyleneglycol, butylene glycol and the like, and subsequently treating the resulting product with an alkaline component.

Other polymeric polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen peroxy compound, actinic light and the like, they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl-2,3-epoxypropyl ether), poly(2,3-epoxypropyl crotonate), allyl-2,3-epoxypropyl ether-styrene copolymer, methallyl-3,4-epoxybutyl ether-allyl benzoate copolymer, poly(vinyl-2,3-epoxypropyl ether), allyl glycidyl ether-vinyl acetate copolymer and poly(4-glycidyloxystyrene).

Examples of non-terminal polyepoxides include epoxidized esters of polyethylenically unsaturated monocarboxylic acids, such as epoxidized linseed, soybean, perilla, oiticia, tung, walnut and dehydrated castor oil, methyl linoleate, butyl linoleate, ethyl 9,12 - octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed and the like.

Another group of non-terminal polyepoxides includes the epoxidized esters of unsaturated monohydric alcohols and polycarboxylic acids, such as, for example, di(2,3-epoxybutyl) adipate, di(2,3-epoxybutyl) oxalate, di(2,3-epoxyheptyl) succinate, di(2,3 - epoxybutyl) maleate, di(2,3-epoxyoctyl) pimelate, di(2,3-epoxypropyl) phthalate, di(2,3-epoxycyclohexyl) adipate, di(2,3-epoxypentyl) thiodipropionate, di(5,6 - epoxytetradecyl) diphenyldicarboxylate, di(3,4-epoxyheptyl) sulfonyldibutyrate, tri(2,3-epoxypropyl)1,2,4 - butanetricarboxylate, di(5,6 - epoxypentadecyl) tartarate, di(4,5 - epoxytetradecyl) maleate, di(3,4-epoxybutyl) citrate, and di(4,5 - epoxyoctadecyl) malonate. Preferred members of this group comprise the glycidyl esters, such as the glycidyl esters of the dicarboxylic acids preferably containing from 2 to 18 carbon atoms, such as diglycidyl phthalate, diglycidyl maleate, diglycidyl adipate, diglycidyl sebacate, diglycidyl cyclohexandedicarboxylate and the like.

Another group of the polyepoxides includes the epoxidized esters of unsaturated alcohols and unsaturated carboxylic acids, such as 2,3-epoxybutyl 3,4-epoxypentanoate, 3,4 - epoxyhexyl 3,4 - epoxypentanoate, 3,4-epoxycyclohexyl 3,4-epoxycyclohexanoate, 3,4-epoxycyclohexyl 4,5 - epoxyoctanoate, 2,3-epoxycyclohexylmethyl epoxycyclohexane carboxylate.

Still another group of the epoxy-containing materials includes epoxidized derivatives of polyethylenically unsaturated polycarboxylic acids such as, for example, dimethyl 8,9,12,13-diepoxyeicosanedioate,
dibutyl 7,8,11,12-diepoxyoctadecanedioate,
dioctyl 10,11-diethyl-8,9,12,13-diepoxy-eiconsanedioate,
dihexyl 6,7,10,11-diepoxyhexadecanedioate,
didecyl 9-epoxy-ethyl-10,11-epoxyoctadecanedioate,
dibutyl 3-butyl-3,4,5,6-diepoxycyclohexane-1,2-dicarboxylate,
dicyclohexyl 3,4,5,6-diepoxycyclohexane-1,2-dicarboxylate,
dibenzyl 1,2,4,5-diepoxycyclohexane-1,2-dicarboxylate and
diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13 - eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexane and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Particularly preferred epoxy-containing organic materials to be employed in the present invention are the members of the group consisting of the organic compounds possessing a plurality of epoxyalkoxy radicals, e.g., two to four, joined to an organic radical which contains from one to two aromatic rings, organic compounds possessing a plurality of epoxyhydroxyalkoxy radicals, e.g., two to four, joined to an organic radical containing from one to two aromatic rings, the polyepoxy-containing polymeric reaction product of an aromatic polyhydric phenol and epihalohydrin, the polyepoxy-containing polymeric reaction product of an aliphatic polyhydric alcohol and epichlorohydrin, the polyepoxy-containing polymeric reaction product of a polyhydric phenol and a polyepoxide compound, the polyepoxy-containing polymeric reaction product of an aliphatic polyhydric alcohol and a polyepoxide compound, the polymers of the epoxy-containing monomers possessing at least one polymerizable ethylenic linkage prepared in the absence of alkaline or acidic catalysts, and copolymers of the foregoing epoxy-containing monomers and a monomer containing at least one $CH_2=C=$ group prepared in the absence of alkaline or acidic catalysts. The expression "epoxyalkoxy" radical refers to an alkoxy radical substituted with an epoxy group. The expression "epoxyhydroxyalkoxy radical" refers to an alkoxy radical substituted with a hydroxyl and epoxy group.

Coming under special consideration, particularly because of the fine quality of coatings prepared from their resinous products are the monomeric and polymeric-type glycidyl polyethers of dihydric phenols obtained by reacting epichlorohydrine with a dihydrin phenol in an alkaline medium. The monomeric products of this type may be represented by the general formula

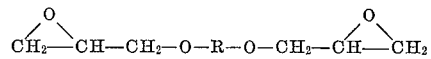

wherein R represents a divalent hydrocarbon radical of the dihydric phenol. The polymeric products will generally not be a single simple molecule but will be a complex mixture of glycidyl polyethers of the general formula

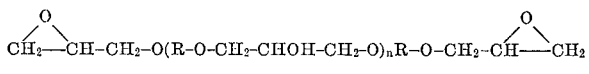

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess, to the epichlorohydrin. The reaction is preferably accomplished at temperature within the range of from 50° to 150° C. The heating is continued for several hours to effect the reaction and the product is then washed free of salt and base.

Preferred members of the above-described group of polyepoxides are the glycidyl polyesters of the dihydric phenols, and especially 2,2-bis(4-hydroxyphenyl) propane (i.e. bisphenol A), having an epoxy equivalency between 1.0 and 2.0 and a molecular weight between 900 and 2,900. Particularly preferred are those having a Durrans mercury method softening point of at least about 100° C.

Another suitable group of polyglycidyl ethers for use in this invention are the polyglycidyl ethers of alpha, alpha, -omega, omega-tetrakis(hydroxyaryl) alkanes. This group of compounds is described and illustrated in U.S. 2,806,016 to Schwarzer. The polyglycidyl ether prepared as in Example I of said patent has a melting point of about 85° C. and contains 0.452 epoxy equivalent per 100 grams.

The curing agents are used in an amount sufficient to cure the epoxy resin to an insoluble and infusible polymer. Preferably, the defined diadducts are used in ratios by weight curing agent to epoxy resin of from about 5:95 to 40:60.

The following examples will serve to illustrate the invention:

EXAMPLE I

Two moles, 142 grams, of acrylamide were dissolved in methanol. While stirring at the reflux temperature of methanol, one mole, 142.0 grams, of 1,4-cyclohexyl-bis-methylamine in methanol was added slowly. After the addition was complete the reactants were refluxed for one hour. Stripping off the methanol and drying the resulting product resulted in a diadduct which had analysis as follows: Amine value 381 (theor. value 395), percent N was 18.2 (theor. percent N 19.7). This water soluble product is a white semisolid having the formula

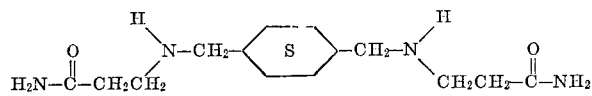

EXAMPLE II

Acrylamide (2 mols), 142 grams, was dissolved in methanol and brought to the reflux temperature. To this was added slowly aminoethylpiperazine (1 mol), 129 grams, also dissolved in methanol. After it was complete the reactant were agitated and refluxed for an additional 60 minutes. The methanol was then stripped off under vacuum and the product collected. It was a white solid having the following analyses: Amine No. 609 (theor. Amine No. 621), percent N 24.5 (theor. percent N 25.8). It was the formula

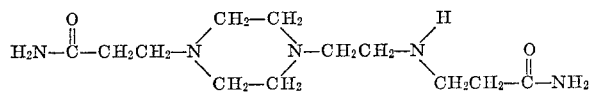

EXAMPLE III 236.1 grams of an epoxy resin derived from bisphenol A and epichlorohydrin having an epoxy equivalent weight of 525 were melted at 120° C. 63.9 grams of the curing agent of Example I were melted at 120° C. and added to the melted epoxy, stirring rapidly. Immediately upon attaining a homogeneous product, it was poured out and cooled. This product, when pulverized into a fine powder, gelled in 15 sec. at 150° C. and immediately at 205° C. The cure time of this product was established by running extensibility tests. The product was completely cured after 1 minute at 232° C., thus qualifying as a rapid curing system.

EXAMPLE IV

The curing agent of Example II was blended with an epoxy resin derived from bisphenol A and epicloroydrin having an epoxy equivalent weight of 925, in three different ratios, namely, 32.3 grams of curing agent to 267.7 grams of epoxy resin, 38.3 grams of curing agent to 261.7 of epoxy resin and 44.3 grams of curing agent to 255.7 grams of epoxy resin. These blends were designated Nos. 1, 2 and 3 respectively. No. 1 gelled in 60 seconds at 150° C. and 30 seconds at 205° C. No. 2 gelled in 75 seconds at 150° C. and 35 seconds at 205° C. No. 3 gelled at 45 seconds at 150° C. and 25 seconds at 205° C. There was no bubbling in the film as might be caused by reversal of the reaction and the liberation of volatile by-product. The cure time of this material was found to be 3 minutes at 232° C., at the end of which time it passed the extensibility test.

EXAMPLE V

A coating powder suitable for insulating the stators of electric motors was compounded as follows:

| | Grams |
|---|---|
| Epoxy resin (as used in Example III) | 4460 |
| N,N'-bis(3-propioamide) aminoethylpiperazine (of Example II) | 790 |
| Powdered mica | 1580 |
| Amorphous silica | 211 |

The powdered mica is intended for thermal resistance and the amorphous silica is intended as a flow control agent. The epoxy resin was melted in a Baker-Perkins dispersion blade blender and maintained at 120° C. The curing agent was added and blended for 1½ minutes. The entire mass was poured over Dry Ice to cool quickly. This material was then pulverized to produce a solid powdered coating suitable for fluid bed application and for other methods of application. A square probe measuring 7/16 inch by 7/16 inch by 4 inches was coated with this composition and the composition cured in 2 to 3 minutes at 232° C. The percentage of coating on the edge was compared to that on the flat was 68%. The coated probe had a cut through temperature on the edge of more than 238° C.

EXAMPLE VI

The coating powder formulated in Example V was used to coat 5-inch electric motor stators in a commercial spray coating machine. This machine put on the stator a fused film thickness of 11–16 mils of coating composition. On the corners, the coating was from 4–7 mils thick. The average edge coverage in the stators with this powder was near 45%. The best edge coverage achieved on a single stator was 60%.

A variability study on the coating thickness on stators was conducted with these machine-coated stators. Measuring 10 pieces cut from 5 stators the variance of the coating thickness on the flats was about 3, the variance of the coating thickness on the corners was less than 1, and the variance in percentage edge coverage was approximately 50. This variance compares very favorably with the variance in percent edge cover achieved by two commercial coating powders applied on this same coating machine. In each case, the variance in percent edge cover was over 100 with these commercial products.

EXAMPLE VII

A stator coating powder was formulated using the following amounts of the following ingredients:

| | Grams |
|---|---|
| Epoxy resin (as used in Example III) | 4800 |
| N,N'-bis(3-propioamide) aminoethylpiperazine (of Example II) | 822 |
| Silicone resin | 56 |
| Powdered mica | 1690 |
| Amorphous silica | 281 |
| TiO₂ pigment | 411 |

The silicone resin is intended as an anti-cratering agent. The procedure used in formulating this stator coating powder was similar to that used in Example VI. This powder gelled at 150° C. in 3 minutes and at 205° C. in 1 minute. When coated by the fluidized bed process on a steel probe, the coating was smooth and glossy with only a slight waviness on its surface. It had 62% edge coverage on a square probe and had a cut through temperature greater than 238° C. The cure time at 232° C. was 3–4 minutes. Several steel probes were coated with this powder and cured for 10 min. at 232° C. The probes were then immersed in the following solvents and chemicals:

| | |
|---|---|
| Water | 10% citric acid |
| Aviation gasoline | Mineral spirits |
| 20% hydrochloric acid | Methyl isobutyl ketone |
| 50% sulfuric acid | Acetone |
| 20% nitric acid | 5% acetic acid |
| 30% sodium hydroxide | Methanol |
| Isopropanol | Ethanol |
| Oleic acid | Chloroform |
| 20% lactic acid | Toluene |

After 24 hours immersion at 25° C., only 2 solvents had affected the films. These were acetone, which softened the film, and chloroform which softened and loosened the film. All other solvents and chemicals had no noticeable effect. The immersion was continued until 7 days had passed at which time examination was again made. No further deterioration of the coatings on the probes was noted in any of the solvents or chemicals.

EXAMPLE VIII

Into a reaction flask were weighed 142.2 grams (2.0 mols) of acrylamide and 500 grams absolute methanol. Stirring brought the acrylamide into solution. At 50° C. the acrylamide solution was stirred while 164.0 grams (1.0 mol) of 1,4-benzene-bis-ethylamine in 164 grams of absolute methanol were added slowly. The exothermic heat of reaction maintained the reactant temperature at 55° C. After one hour at reflux (67° C.) the methanol was stripped off under vacuum and the white crystalline solid dried. The diadduct analyzed as follows: Amine value=366.6 (theory 367) and percent N=17.4 (theory 18.3). It had the formula $$H_2N-\overset{O}{\overset{\|}{C}}-CH_2CH_2 \overset{H}{\underset{}{N}}-CH_2CH_2-\underset{}{\bigcirc}-CH_2CH_2-\overset{H}{\underset{}{N}} \overset{}{CH_2CH_2-\overset{O}{\overset{\|}{C}}-NH_2}$$

67.8 grams of the above acrylamide adduct at 110° C. was mixed with 232.2 grams of the epoxy resin of Example III and was stirred for 30 seconds at this temperature. The mixture was then allowed to cool and solidify and was pulverized. The pulverized product fused well when heated. It had a 4.56 inch flow on the 60° incline at 150° C. and gelled in 2 minutes at this temperature. At 205° C. it gelled in 30 seconds. Films were free from bubbles when cured. The cure time was 9 minutes at 150° C. or 1 minute at 232° C. Films prepared from this composition when cured at 150° C. appeared satisfactory and passed about two-thirds of the Olson-Button Extensibility tests applied to them. This is equivalent to 26% film extension.

EXAMPLE IX

The diacrylamide adduct of piperazine was prepared by refluxing in methanol 2 mols (142 g.) of acrylamide with 1 mol (86 g.) of piperazine for one hour. After vacuum stripping the white solid analyzed as follows:

Amine#=486 (theor.=475)
Percent N=24.5 (theor.=27.1)
M.P.=230° C.

It had the formula $$H_2N-\overset{O}{\overset{\|}{C}}-CH_2CH_2-N\overset{CH_2-CH_2}{\underset{CH_2-CH_2}{\diagup\diagdown}}N-CH_2CH_2-\overset{O}{\overset{\|}{C}}-NH_2$$

To 244.8 grams (0.234 mol) of the epoxy resin as used in Example III at 150° C. were added 55.2 grams (0.234 mol) of the diacrylamide adduct of piperazine described above. The temperature was raised to 180° C. and after about 5 minutes at this temperature, the curing agent was dissolved in the epoxy resin and the mixture was quickly quenched.

After grinding to fine particle size the powder was checked for cure time. At 150° C. it cured in 7.0–7.5 minutes and at 205° C. in 3.5–4.0 minutes. A 3 gram pellet, 1⅛″ diameter, flowed 7.37″ down a 60° inclined hot plate held at 150° C. The films were hard and glossy when cured and gave good adhesion to steel. It would be useful as an epoxy film where hardness and adhesion were more important than film flexibility.

EXAMPLE X 21.3 grams (0.14 equivalent) of the diadduct of Example VIII and 16.5 grams (0.14 equivalent) of the diadduct of Example IX were blended at 150° C. with 260 grams (0.28 equivalent) of the epoxy resin as used in Example IV for 1 minute. The product was a clear solid which pulverized well in standard equipment. The powder flowed 3.06 inches on the 60° incline at 150° C. and gelled in 4½ minutes at this temperature. At 205° C. it gelled in 1½ minutes. The cure time at 150° C. was 90 minutes and at 232° C. was 6 minutes. When cured at 150° C., it passed the Olson-Button test with only minor cracking evidence. The film was hard, free of pock marks and free of bubbles. The blend is thus relatively slow curing and easily handled as a powder coating resin.

While the above description has been with particular reference to specific examples, it is to be understood that the invention is not restricted thereto but may be varied within the scope of the appended claims.

The embodiments of the invention in which an exclusive property or privilege is claimed are defined as follows:

1. A curable composition comprising an epoxy resin having more than one $$-\overset{O}{\overset{\diagup\diagdown}{C----C-}}$$

group and a curing agent in an amount sufficient to cure the epoxy resin to an insoluble and infusible polymer, said curing agent being selected from compounds of the formulae (I)
$$H_2N-\overset{O}{\overset{\|}{C}}-CH_2CH_2 \overset{H}{\underset{}{\diagdown N}}(-CH_2)_n-R-(CH_2-)_n\underset{}{\overset{H}{N\diagup}} CH_2CH_2-\overset{O}{\overset{\|}{C}}-HN_2$$

and (II)
$$H_2N-\overset{O}{\overset{\|}{C}}-CH_2CH_2-N\overset{CH_2-CH_2}{\underset{CH_2-CH_2}{\diagup\diagdown}}N-Z$$

where R is $$\bigcirc \text{ or } \bigcirc_S$$

$n$ is 1 or 2, Z is $$CH_2CH_2-\overset{O}{\overset{\|}{C}}-NH_2$$

or $(CH_2)_x-R'$, $x$ is 1, 2 or 3, and R′ is $$\overset{H}{\underset{}{N\diagup}}\overset{O}{\overset{\|}{CH_2CH_2-\overset{\|}{C}-NH_2}}$$

or $$N\overset{CH_2-CH_2}{\underset{CH_2-CH_2}{\diagup\diagdown}}N-CH_2CH_2-\overset{O}{\overset{\|}{\overset{N}{C}}}-NH_2$$

2. The curable compositions of claim 1 wherein the curing agent has the formula $$H_2N-\overset{O}{\overset{\|}{C}}-CH_2CH_2-N\overset{CH_2-CH_2}{\underset{CH_2-CH_2}{\diagup\diagdown}}N-CH_2CH_2-\overset{H}{\underset{}{N\diagup}}\overset{O}{\overset{\|}{CH_2CH_2-\overset{\|}{C}-NH_2}}$$

3. The curable composition of claim 1 wherein the curing agent has the formula

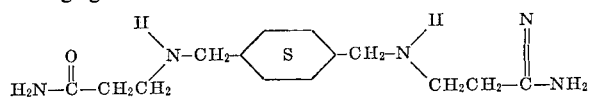

4. The pocress of preparing a curable composition which comprises reacting an epoxy resin having more than one

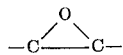

group with a curing agent in an amount sufficient to cure the epoxy resin to an insoluble and infusible polymer and terminating the reaction prior to completion, said curing agent being selected from compounds of the formulae (I)
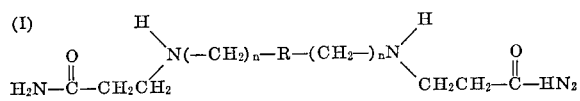

and (II)
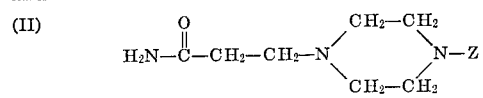

where R is

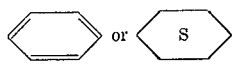

$n$ is 1 or 2, Z is

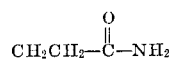

or $(CH_2)_x$—R', $x$ is 1, 2 or 3, and R' is

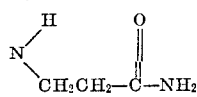

or

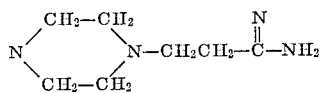

5. The process of claim 4 wherein the curing agent has the formula

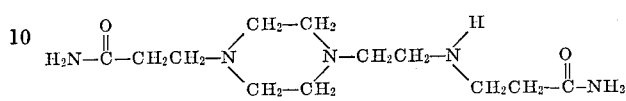

6. The process of claim 4 wherein the curing agent has the formula

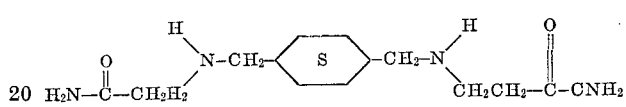

7. The curable composition prepared by the process of claim 4.

8. The curable composition prepared by the process of claim 5.

9. The curable composition prepared by the process of claim 6.

References Cited
UNITED STATES PATENTS 2,965,609  12/1960  Newey _____ 260—47EpCN
3,048,620   8/1962  Spivack _____ 260—2EpCN HAROLD D. ANDERSON, Primary Examiner T. E. PERTILLA, Assistant Examiner U.S. Cl. X.R.

117—127; 260—2, 18, 88.3

PO-1050
(5/69)

UNITED STATES PATENT OFFICE
CERTIFICATE OF CORRECTION

Patent No. 3,557,056               Dated January 19, 1971

Inventor(s) Dwight E. Peerman

It is certified that error appears in the above-identified patent and that said Letters Patent are hereby corrected as shown below:

Column 1, lines 40-42, that portion of the formula reading
"$\overset{N}{\underset{\|}{-C-NH_2}}$" should read -- $\overset{O}{\underset{\|}{-C-NH_2}}$ --. Column 3, line 64, "hydroxy should read --hydroxyl--. Column 4, line 23, "epoxyproxy" should read --epoxypropoxy--; line 24, "epoxyproxy" should read --epoxypropoxy--; line 37, "bis-phenols" should read --bis-pheno line 46, "polyepoxypolyhdroxy" should read --polyepoxypolyhydrox Column 6, line 72, "temperature" should read --temperatures--. Column 7, line 2, "polyesters" should read --polyethers--; line 44, "reactant" should read -- reactants--; line 49, "was" should read --had--. Column 9, lines 41-43, that portion of the formul reading "$\overset{C}{\underset{\|}{-C -NH_2}}$" should read -- $\overset{O}{\underset{\|}{-C-NH_2}}$ --. Column 10, line 70 "compositions" should read --composition--. Column 11, lines 3- that portion of the formula reading
"$\overset{N}{\underset{\|}{-C-NH_2}}$" should read -- $\overset{O}{\underset{\|}{-C-NH_2}}$--. Column 12, lines 2-4, that portion of the formula reading
"$\overset{N}{\underset{\|}{-C-NH_2}}$" should read -- $\overset{O}{\underset{\|}{-C-NH_2}}$ --; lines 17-20, that portion of the formula reading
"$\overset{O}{\underset{\|}{-C-CNH_2}}$" should read -- $\overset{O}{\underset{\|}{-C-NH_2}}$ --.

Signed and sealed this 8th day of June 1971.

(SEAL)
Attest:

EDWARD M.FLETCHER,JR.
Attesting Officer

WILLIAM E. SCHUYLER
Commissioner of Pat